United States Patent
Valouch et al.

(10) Patent No.: US 12,050,172 B2
(45) Date of Patent: Jul. 30, 2024

(54) SPECTROMETER DEVICE FOR OPTICAL ANALYSIS OF AT LEAST ONE SAMPLE

(71) Applicant: trinamix GmbH, Ludwigshafen am Rhein (DE)

(72) Inventors: Sebastian Valouch, Ludwigshafen (DE); Robert Send, Karlsruhe (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 269 days.

(21) Appl. No.: 17/613,546

(22) PCT Filed: May 26, 2020

(86) PCT No.: PCT/EP2020/064569
§ 371 (c)(1),
(2) Date: Nov. 23, 2021

(87) PCT Pub. No.: WO2020/239762
PCT Pub. Date: Dec. 3, 2020

(65) Prior Publication Data
US 2022/0236172 A1    Jul. 28, 2022

(30) Foreign Application Priority Data
May 27, 2019 (EP) ..................... 19176741

(51) Int. Cl.
*G01N 21/35* (2014.01)
(52) U.S. Cl.
CPC ..... *G01N 21/35* (2013.01); *G01N 2201/0221* (2013.01)
(58) Field of Classification Search
CPC ........... G01N 21/35; G01N 2201/0221; G01N 2021/8592; G01N 21/85; G01N 21/8507;
(Continued)

(56) References Cited

U.S. PATENT DOCUMENTS 5,112,127 A * 5/1992 Carrabba .................. G01J 3/44
356/301
8,346,347 B2 1/2013 Altshuler et al.
(Continued)

FOREIGN PATENT DOCUMENTS

CN 101309631 A 11/2008
CN 105008894 A 10/2015
(Continued)

OTHER PUBLICATIONS

International Search Report and Written Opinion for corresponding PCT/EP2020/064569 mailed Jul. 1, 2020, 9 Pages.

*Primary Examiner* — David P Porta
*Assistant Examiner* — Mamadou Faye
(74) *Attorney, Agent, or Firm* — Armstrong Teasdale LLP

(57) ABSTRACT

Described herein is a spectrometer device for optical analysis of at least one sample. The spectrometer device includes: at least one housing having at least one entrance window; at least one wavelength-selective element configured for separating incident light into a spectrum of constituent wavelengths, the wavelength-selective element being disposed within the housing; at least one detector device configured for detecting at least a portion of the constituent wavelengths, the detector device being disposed within the housing; and at least one contact sensor device for detecting a contact of the spectrometer device with the sample, where the contact sensor device includes at least one optical contact sensor device, where the optical contact sensor device is configured to detect an influence of the presence of the sample onto the transmission of the optical signal.

16 Claims, 1 Drawing Sheet

(58) Field of Classification Search
CPC ...... G01J 3/0205; G01J 3/0256; G01J 3/0264; G01J 3/0272; G01J 3/0275; G01J 3/0278; G01J 3/0289; G01J 3/26; G01J 3/0291
See application file for complete search history.

(56) References Cited

U.S. PATENT DOCUMENTS

| | | |
|---|---|---|
| 2004/0147984 A1 | 7/2004 | Altshuler et al. |
| 2008/0033275 A1 | 2/2008 | Blank et al. |
| 2008/0319382 A1 | 12/2008 | Blank et al. |
| 2009/0073421 A1* | 3/2009 | Jung ..................... G01J 1/0437 356/402 |
| 2011/0075146 A1* | 3/2011 | Moroney ............... G01J 3/0208 356/402 |
| 2014/0103199 A1 | 4/2014 | Loong et al. |
| 2014/0191110 A1 | 7/2014 | Holenarsipur |
| 2016/0003736 A1 | 1/2016 | Gigler et al. |
| 2016/0178509 A1* | 6/2016 | Carter ..................... G01J 3/08 356/451 |
| 2018/0231415 A1* | 8/2018 | Marquardt ............. G01N 21/65 |
| 2019/0017922 A1* | 1/2019 | Bush ..................... G01N 21/01 |

FOREIGN PATENT DOCUMENTS

| | | |
|---|---|---|
| EP | 1063501 A1 | 12/2000 |
| EP | 1240617 A2 | 9/2002 |
| GB | 2006435 A | 5/1979 |
| JP | H09318432 A | 12/1997 |
| WO | 9708537 A1 | 3/1997 |
| WO | 0148684 A2 | 7/2001 |
| WO | 0148684 A3 | 12/2001 |

\* cited by examiner

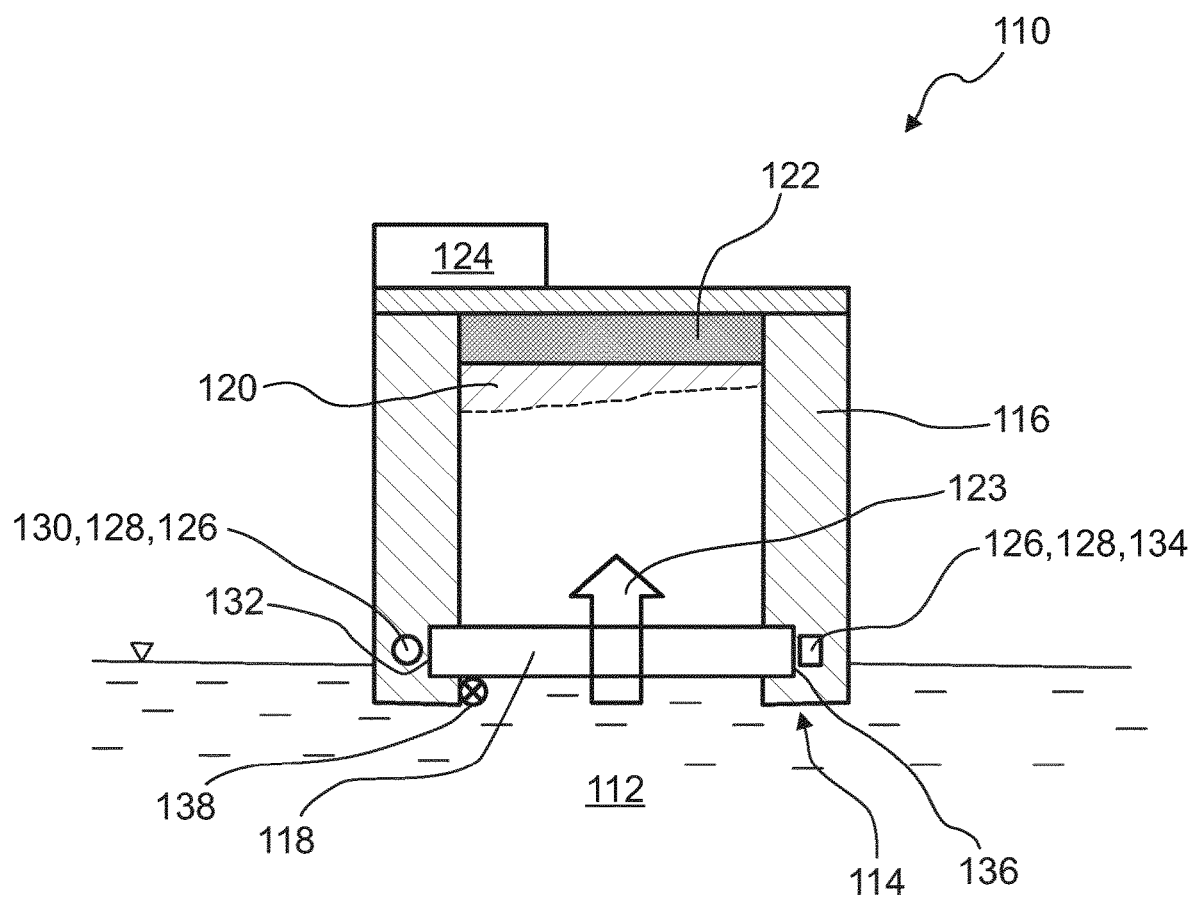

SPECTROMETER DEVICE FOR OPTICAL ANALYSIS OF AT LEAST ONE SAMPLE

CROSS-REFERENCE TO RELATED APPLICATIONS

This application is a U.S. National Phase Application of International Patent Application No. PCT/EP2020/064569, filed May 26, 2020, which claims priority to European Patent Application No. 19176741.7, filed May 27, 2019, the entire contents of which are hereby incorporated by reference herein.

TECHNICAL FIELD

The invention relates to a spectrometer device, to a method for optically analyzing at least one sample, to a use of the spectrometer device and to a computer program for use in the spectrometer device. Such devices and methods can, in general, be employed e.g. for investigation or monitoring purposes, in particular, in the infrared (IR) spectral region, especially in the near-infrared (NIR) and the mid infrared (MidIR) spectral regions. However, further kinds of applications are possible.

BACKGROUND ART

Various spectrometer devices and systems for investigations in the infrared (IR) spectral region, especially in the near-infrared (NIR) spectral region, are known. The spectrometer devices and systems generally comprise one or more wavelength-selective elements for separating incident light into a spectrum of constituent wavelengths and one or more detected devices for detecting the constituent wavelengths, such as one or more prisms, gratings, filters or the like. Especially, spectrometer devices which comprise a combination of a linearly variable filter (LVF) and a detector array have already been proposed. Herein, the LVF is designated for separating light captured from an object, also referred to as a sample, into a spectrum of constituent wavelength signals while the detector array includes a plurality of pixels, wherein each of the plurality of pixels is disposed to receive at least a portion of a plurality of the constituent wavelength signals that provides a power reading for each constituent wavelength. Typically, in order to accomplish that the incident light may impinge the LVF in a manner normal to a receiving surface of the LVF, a baffle is used for this purpose, which, however, generally results in a low light throughput and a poor signal-to-noise ratio.

In US 2018/231415 A1 an enclosed benchtop analytical device, as well as systems processes, and techniques related thereto are described. The benchtop analytical device can include an enclosure enclosing a probe and a sample. A compliance component can determine satisfaction of one or more compliance rules, such as a compliance rule relating to an enclosure being in an operable configuration based on a lid of the enclosure being closed. If the compliance rule(s) is determined to be satisfied, the compliance component may enable the release of optical energy for interrogation of the sample via the probe.

Further, EP 1 063 501 A1 describes a measurement head for an optical measurement device, especially a spectrometer device, comprising a front unit, being moveable and/or compressible and extendable between a starting position and a measuring position, wherein said front unit is biased to be in the starting position, a fixed rear unit, a sensor for indicating, whether said front unit is in said measuring position, wherein said front unit further comprises at least three carrier points for positioning a sample relative to said front unit, wherein said at least three carrier points are each provided with a sensor indicating, whether said sample is in contact with the respective carrier point.

For applications in the field, portable spectrometer devices have been developed. Thus, as one of the various examples, US 2014/131578 A1 discloses a portable spectrometer device which includes an illumination source for directing at a sample as well as a tapered light pipe (TLP) for capturing the light which interacts with the sample at a first focal ratio and for delivering the light at a second focal ratio lower than the first focal ratio to the LVF. Further, WO 97/08537 A1 describes a handheld device for infrared reflectance measurements of samples for identification of the sample materials is a self-contained portable unit built into a handheld housing. For further portable spectrometers and spectrometer principles, which may also be used in the context of the present invention, reference may be made to Richard A. Crocombe, "Handheld spectrometers in 2018 and beyond: MOEMS, photonics, and smartphones," Proc. SPIE 10545, MOEMS and Miniaturized Systems XVII, 105450C (22 Feb. 2018); doi: 10.1117/12.2286492.

Further, US 2004/147984 A1 describes an apparatus that uses at least one low power optical radiation source in a suitable head which can be held over a treatment area for a substantial period of time or can be moved over the treatment area a number of times during each treatment. The apparatus, a hand held light emitting applicator (LEA) or light emitting skin applicator (LESA), can be in the form of a brush or roller adapted to be moved over the patient's skin surface as radiation is applied to the skin. The skin-contacting surface of the LEA or LESA can have protuberances such as projections or bristles that can massage the skin and deliver radiation. In addition, an apparatus which delivers optical radiation to a treatment area is disclosed that contains a retrofit housing adapted to be joined to a skin-contacting device.

In JP S60 241260 A, a small contact sensor is described, wherein a contact state is detected always with high accuracy. A pair of piezoelectric elements are provided on a vibrator, wherein one piezoelectric element is used for the vibrator to be vibrated, while detecting means for detecting a force occurring at the other piezoelectric element due to the vibration are provided. When a sample contacts the vibrator and the vibration of the vibrator is limited, the contact state of the sample is detected with the detecting means.

Further, EP 1 240 617 A2 A1, published as WO 01/48684 A2, describes a method and apparatus using bending wave vibration to calculate information relating to a contact on a contact sensitive device. The method comprises the steps of providing a member in the contact sensitive device capable of supporting bending waves, providing means attached to the member for measuring bending wave propagation in the member to determine a measured bending wave signal and processing the measured bending wave signal to calculate information relating to the contact.

Specifically the application of hand-held spectrometer devices in the field, however, may lead to challenges with respect to measurement accuracy. Thus, in many instances, spectrometers working in reflective mode are required to be in a well-defined contact to the sample. Typically, the entrance window of the spectrometer device or a mechanical spacer touches the sample. As an example, the entrance window may be required to be immersed in an oil to be analyzed, or a mechanical spacer may be required to touch the surface of a piece of wood to be analyzed. If the spectrometer device has insufficient or insufficiently well-defined contact to the sample, light attenuation from the sample may be estimated incorrectly.

Problem to be Solved

It is therefore desirable to provide devices and methods which address the above-mentioned challenges and shortcomings of known spectrometer devices. Specifically, devices and methods shall be proposed which enable highly reproducible spectrometer measurements in the field, even under rough environmental conditions.

SUMMARY

This problem is addressed by a spectrometer device, a method for optically analyzing at least one sample, a use of the spectrometer device and a computer program for use in the spectrometer device, with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a spectrometer device for optical analysis of at least one sample is proposed. The spectrometer device comprises:
- at least one housing having at least one entrance window;
- at least one wavelength-selective element configured for separating incident light into a spectrum of constituent wavelengths, the wavelength-selective element being disposed within the housing;
- at least one detector device configured for detecting at least a portion of the constituent wavelengths, the detector device being disposed within the housing; and
- at least one contact sensor device for detecting a contact of the spectrometer device with the sample.

The term "spectrometer device" is a broad term and is to be given its ordinary and customary meaning to a person of ordinary skill in the art and is not to be limited to a special or customized meaning. The term specifically may refer, without limitation, to a device capable of optically analyzing at least one sample, thereby generating at least one item of information on at least one spectral property of the sample. Specifically, the term may refer to a device which is capable of recording the signal intensity with respect to the corresponding wavelength of a spectrum or a partition thereof, such as a wavelength interval, wherein the signal intensity may, preferably, be provided as an electrical signal which may be used for further evaluation. The spectrometer device, additionally or alternatively, may also be fully or partially embodied as a Fourier transform spectrometer device. The spectrometer device, generally, may be operable e.g. in a reflective mode and/or may be operable in a transmissive mode.

The spectrometer device specifically may be a hand-held spectrometer device. The term "handheld" is a broad term and is to be given its ordinary and customary meaning to a person of ordinary skill in the art and is not to be limited to a special or customized meaning. The term specifically may refer, without limitation, to the property of a device capable of being mobile and/or moved by a human user, specifically capable of being carried by a human user, specifically capable of being carried by a human user with a single hand. Specifically, the hand-held device may be dimensioned for being carried by the human user, e.g. by having extensions in any dimension not exceeding 500 mm, specifically not exceeding 300 mm. Additionally or alternatively, the hand-held device, for being carried by the human user, may have a weight not exceeding 5 kg, specifically not exceeding 3 kg or even not exceeding 0.5 kg.

The term "analyzing" or the term "analysis" are broad terms and are to be given their ordinary and customary meaning to a person of ordinary skill in the art and are not to be limited to a special or customized meaning. The terms specifically may refer, without limitation, to the process of deriving at least one item of information on a property of a sample. Consequently, the terms "optically analyzing" or "optical analysis" referred to the process of analyzing or an analysis by using optical means, such as spectroscopic means. Specifically, the spectrometer device may be configured for deriving at least one item of information on at least one spectral property of the sample. As an example, the spectrometer device may be configured for deriving at least one item of spectral information on the sample, such as at least one distribution of intensities over a spectral range for a reflection spectrum and/or for a transmission spectrum. Additionally or alternatively, the analysis may be or may comprise a Fourier transform spectrometric analysis. Other examples, however, are possible. The hand-held spectrometer device specifically may be configured for providing at least one item of electronic information, such as an analogue and/or digital signal, representative for the at least one item of spectral information.

The term "sample" is a broad term and is to be given its ordinary and customary meaning to a person of ordinary skill in the art and is not to be limited to a special or customized meaning. The term specifically may refer, without limitation, to an arbitrary amount of material, an element or a device to be analyzed. Specifically, the sample may be an amount of material, such as an amount of one or more of liquid, powder, pellets, particles or gas. As an example, the sample may comprise solid bulk material such as grain. Alternatively, however, the sample may also be or may comprise solid articles such as fruits or vegetables. Other examples are possible. Specific examples of samples and applications will be given in further detail below.

The term "housing" is a broad term and is to be given its ordinary and customary meaning to a person of ordinary skill in the art and is not to be limited to a special or customized meaning. The term specifically may refer, without limitation, to an element or a combination of elements which are configured for fully or partially surrounding and/or providing mechanical cover for one or more other elements. Thus, as an example, the housing may be or may comprise at least one rigid housing, such as at least one rigid housing made of at least one of a plastic material or a metal. The rim specifically may be configured for engagement with the housing by one or more of a form-fit connection, a force-fit connection or a connection by material engagement. Thus, as an example, as will be outlined in further detail below, the rim may be or may provide one or more connection elements and/or may provide for a flexible frame and/or sealing frame which may fully or partially surround a front surface of the spectrometer device.

The term "entrance window" is a broad term and is to be given its ordinary and customary meaning to a person of ordinary skill in the art and is not to be limited to a special or customized meaning. The term specifically may refer, without limitation, to an arbitrary element, such as an optically transparent element made of one or more of glass, quartz, sapphire or a plastic material, or an opening of the hand-held spectrometer device allowing for the light entering the housing. Thus, as an example, the entrance window may be or may comprise an opening in the housing. The opening may be empty or may fully or partially be filled with one or more transparent elements, such as one or more transparent elements selected from the group consisting of glass elements, quartz elements or plastic elements.

The term "wavelength-selective element" is a broad term and is to be given its ordinary and customary meaning to a person of ordinary skill in the art and is not to be limited to a special or customized meaning. The term specifically may refer, without limitation, to an arbitrary element or a combination of elements suitable for one or more of transmitting, reflecting, deflecting or scattering light in a wavelength-dependent manner. The wavelength-selective element, as an example, may be or may comprise at least one element selected from the group consisting of: an optical grating; an optical prism; a wavelength selective optical filter, specifically a length variable filter; a wavelength-selective micro-optical device, specifically a micro-opto-electromechanical (MOEM) device, specifically for use in a Fourier-transform spectrometer.

The term "detector device" is a broad term and is to be given its ordinary and customary meaning to a person of ordinary skill in the art and is not to be limited to a special or customized meaning. The term specifically may refer, without limitation, to an arbitrary device or combination of devices capable of monitoring and/or recording at least one physical, chemical or biological parameter. Specifically, the detector device may comprise at least one optical detector device, such as a device configured for recording and/or monitoring incident light. The detector device may be sensitive in one or more of the visible spectral range, the ultraviolet spectral range or the infrared spectral range, specifically the near infrared spectral range (NIR). The detector device specifically may, thus, be or may comprise an optical detector element, such as at least one optical sensor, e.g. an optical semiconductor sensor. As an example, specifically in case the detector device is sensitive in the infrared spectral range, such as in the near infrared spectral range, the semiconductor sensor may be or may comprise at least one semiconductor sensor comprising at least one material selected from the group consisting of PbS, PbSe, InGaAs, and extended-InGaAs. As an example, the detector device may comprise at least one photodetector such as at least one CCD or CMOS device. The detector device specifically may comprise at least one detector array comprising a plurality of pixelated sensors, wherein each of the pixelated sensors is configured to detect at least a portion of at least one of the constituent wavelengths. Additionally or alternatively, however, the detector device may also comprise at least one single pixel detector device, specifically at least one single pixel optical detector element. The latter specifically may be used in case the spectrometer device is fully or partially embodied as a single pixel spectrometer device, such as a single pixel Fourier transform spectrometer device.

The term "contact sensor device" is a broad term and is to be given its ordinary and customary meaning to a person of ordinary skill in the art and is not to be limited to a special or customized meaning. The term specifically may refer, without limitation, to an arbitrary device which is configured for detecting or sensing a contact between the device and another element or material. Thus, as will be outlined in further detail below, the contact sensor device specifically may be configured for generating at least one signal, specifically an electronic signal, indicative of a contact or non-contact between the contact sensor device and another element or material. Therein, a direct physical contact may be detected and/or a proximity of the other element or material may be detected, such as a proximity within a predefined distance. Thus, the contact sensor device may be in direct contact with the element or material to be detected or maybe an indirect contact with the element or material to be detected, such as via at least one or more intermediate elements or layers, such as one or more cover layers covering the contact sensor device.

The spectrometer device specifically may be configured for being operated in a reflective mode. As used herein, a reflective mode is a mode of operation of a spectrometer device in which the spectrometer device is configured for analyzing light reflected or scattered by the sample. Therein, the light reflected or scattered by the sample may be ambient light and/or maybe light which is generated by the spectrometer device and/or directed by the spectrometer device onto the sample and which, subsequently, is reflected or scattered by the sample, wherein at least a part of the reflected scattered light may be analyzed by the spectrometer device.

Specifically, the spectrometer device may comprise at least one illumination source for illuminating the sample. The illumination source specifically may comprise at least one element selected from the group consisting of: an LED; a laser; an incandescent lamp, specifically an incandescent lamp comprising at least one resistive heating element, more specifically a resistive heating element comprising silicon carbide, more specifically a globar. The at least one illumination source, also referred to as a light source, may fully or partially be located inside the housing of the spectrometer device and/or may fully or partially be located outside the housing of the spectrometer device and/or may also be fully or partially integrated into the housing of the spectrometer device. In case the at least one illumination source is located inside the housing, the illumination of the sample may fully or partially take place through the entrance window of the housing and/or may fully or partially take place through at least one separate illumination opening.

The contact sensor device specifically may be configured for detecting a contact between the entrance window and the sample. Thus, a contact between the entrance window and the sample may be detected in various ways, such as by detecting a pressure onto the entrance window, by optically detecting a contact between the entrance window and the sample or by other detection means, such as by detecting the change of vibrational properties of the entrance window or the like. Generally, as an example, the contact sensor device may comprise at least one of an optical contact sensor device, an electrical contact sensor device or a mechanical contact sensor device, including the option of an acoustic contact sensor device.

Additionally or alternatively, the spectrometer device may comprise at least one spacer element. As used herein, the term "spacer element" specifically may refer to an arbitrary element or a combination of elements configured for bringing or keeping the sample at a predefined distance to the spectrometer device, to the housing of the spectrometer device, to the entrance window or to any other element of the spectrometer device. Thus, as an example, the spacer element may comprise at least one spacer bar, at least one spacer ring or the like.

In case at least one spacer element is comprised by the spectrometer device, the contact sensor device may also be configured for fully or partially detecting a contact of the spacer element with the sample. Again, various sensing principles may be applied for detecting the contact of the spacer element with the sample, such as by using one or more of an optical contact sensor device, a mechanical contact sensor device, an electrical contact sensor device.

As outlined above, the entrance window may fully or partially be made of at least one transparent material. The transparent material, as an example, may fully or partially be made of one or more of an organic transparent material or an inorganic transparent material, such as of at least one of a transparent plastic material, a glass or a quartz or sapphire.

As outlined above, generally, the contact sensor device as an example may comprise at least one device selected from the group consisting of: an optical contact sensor device; an electrical contact sensor device; a mechanical contact sensor device, specifically one or more of a pushbutton; an acoustic contact sensor device.

Thus, the contract sensor device may comprise at least one optical contact sensor device. The optical contact sensor device may be configured for detecting a contact of the entrance window with the sample. As an example, the optical contact sensor device may comprise at least one optical emitter device and at least one optical detector device, wherein at least one optical signal is transmitted from the optical emitter device to the optical detector device. The optical contact sensor device is configured to detect an influence of the presence of the sample onto the transmission of the optical signal. The optical emitter device, as an example, may comprise at least one light-emitting diode and/or at least another type of the light source, positioned at an edge of the entrance window. The optical detector device, as an example, may comprise at least one photodiode and/or another type of photosensitive element and may be positioned at an opposing edge of the entrance window. Generally, the optical contact sensor device may be configured for transmitting the optical signal at least partially by using the entrance window as a waveguide. The optical contact sensor device may be configured such that a contact between the sample and the entrance window changes the waveguide properties of the entrance window. Thus, generally, once an element or a material touches an optical waveguide, the waveguiding properties of the waveguide may change, e.g. due to a variation in the refractive index ratio at the interface between the waveguide and the element or material. As an example, in case a liquid, transparent material touches the waveguide, outcoupling of light may occur, and the waveguiding properties of the waveguide may deteriorate. Generally, the optical contact sensor device may, by analyzing the transmitted signal, detect these changes, e.g. by detecting a deterioration of signal transmission and deterioration of the waveguiding properties.

Additionally or alternatively, the contact sensor device comprises at least one inertial sensor. The term "inertial sensor" is a broad term and is to be given its ordinary and customary meaning to a person of ordinary skill in the art and is not to be limited to a special or customized meaning. The term specifically may refer, without limitation, to a sensor configured for detecting changes in the inertia of at least one element. Thus, as an example, the inertial sensor may be or may comprise at least one vibrational sensor and/or at least one motion sensor. As an example, the vibrational sensor may comprise at least one vibrating mass, such as at least one vibrating surface or membrane, the vibrational properties of which depend on a contact between the vibrating mass and the surrounding environment and/or depend on a covering of the vibrating element with at least one material. Thus, by detecting changes in the vibrating properties of the vibrating mass, such as by detecting shifts in a resonance frequency of the vibrating mass, inertial changes of the vibrating mass, such as a damping contact with a material such as the sample, may be detected. As an example, the vibration of a vibrating membrane is generally damped once the vibrating membrane gets in contact with the sample. Similarly, other types of motions may be damped when a moving element gets in contact with the sample. These changes in the inertial properties may be detected e.g. electronically. The inertial sensor generally may comprise at least one movable element, wherein one or both of a vibration or a motion of the movable element may be changed by contact of the spectrometer device, specifically of the inertial sensor, with the sample. The inertial sensor may, additionally or alternatively, comprise at least one oscillating element, wherein a contact of the spectrometer device with the sample changes at least one oscillation property of the oscillating element.

As outlined above, the at least one contact sensor device further may be or may comprise at least one electronic contact sensor device. Therein, the at least one electronic contact sensor device may, as an example, comprise at least one electromagnetic emitter. Specifically, the electromagnetic emitter may be configured for emitting electromagnetic waves in a range of wavelengths of at least one micrometer, e.g. of at least one millimeter or even at least one meter. As an example, the contact sensor device may comprise at least one of a WiFi or a Bluetooth module. Thus, as an example, a change in reflection and/or transmission of WiFi and/or Bluetooth signals by the presence of the sample may be detected by the contact sensor device.

Generally, the contact sensor device may comprise at least one proximity sensor device. The term "proximity sensor" is a broad term and is to be given its ordinary and customary meaning to a person of ordinary skill in the art and is not to be limited to a special or customized meaning. The term specifically may refer, without limitation, to an arbitrary sensor or sensor device which is configured for detecting the proximity of an element or an object, e.g. a proximity within a predetermined range. For sensing proximity, various sensor principles are generally known, such as electronic proximity sensors, e.g. inductive proximity sensors. Specifically, the contact sensor device may comprise at least one capacitive proximity sensor device. The capacitive proximity sensor device, as an example, may comprise at least one capacitor, the capacitance of which is changed by the proximity of an object or element. Thus, the proximity of the sample may change the capacitance of the capacitive proximity sensor device. The capacitance change may be detected.

The spectrometer device may comprise a single contact sensor device or a plurality of contact sensor devices. In case a plurality of contact sensor devices is comprised, each of these contact sensor devices may provide a sensor signal. The spectrometer device may comprise at least one evaluation device, such as at least one evaluation device having at least one processing unit or processor. The evaluation device may generally be configured for evaluating a combination of sensor signals of the plurality of contact sensor devices. Thus, as an example, the evaluation device may comprise at least one data processing unit, wherein the data processing unit may be configured by programming for evaluating the sensor signals. Specifically, the data processing unit may be configured for applying a mathematical algorithm to the sensor signals of the plurality of contact sensor devices. As an example, the evaluation device may be configured to apply a Kalman filter to the sensor signals. By applying the Kalman filter to the sensor signals, an estimator of the measurement data may be generated and/or errors in the sensor signals may be reduced, thereby generating a more reliable information on the proximity of the sample and/or of the context of the sample with the spectrometer device.

The spectrometer device specifically may be configured for automatically triggering an optical analysis of the at least one sample when the contact sensor device detects a contact of the spectrometer device with the sample. Thus, as an example, the evaluation device may generally control the spectrometer device and/or may be in cooperation with a control device of the spectrometer device. Once the at least one sensor signal of the at least one contact sensor device indicates a contact of the spectrometer device with the sample and/or indicates a proximity of the sample, e.g. within a predetermined range, the evaluation device and/or the control device may trigger the emission of a light beam from the spectrometer device onto the sample and/or may trigger the detector device to detect light, i.e. to detect at least a portion of the constituent wavelengths.

In a further aspect of the present invention, a method for optically analyzing at least one sample, specifically at least one liquid sample, is disclosed. The method comprises the following method steps. The method steps specifically may be performed in the given order. A different order, however, is also possible, including the option of performing one or more of the method steps fully or partially simultaneously. Further, one or more of the method steps may be performed in a repeated fashion. The method may comprise additional steps which are not listed. The method comprises the following steps:

i) providing at least one spectrometer device according to any one of the preceding claims;

ii) approaching at least one sample to be analyzed with the spectrometer device;

iii) detecting a contact of the spectrometer device with the sample by using the contact sensor device; and iv) performing at least one optical analysis of the sample by using the spectrometer device.

In a further aspect, the use of the spectrometer device according to the present invention, such as according to any one of the embodiments disclosed above and/or according to any one of the embodiments disclosed in further detail below, is disclosed, for a purpose of use, selected from the group consisting of: an infrared detection application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; an exhaust control application; a gas sensing application; a gas analytics application; a chemical sensing application.

Further disclosed and proposed herein is a computer program for use in a spectrometer device according to the present invention. The computer program comprises instructions which, when the computer program is executed by an evaluation device of the spectrometer device, cause the evaluation device to evaluate at least one sensor signal provided by the at least one contact sensor device of the spectrometer device and to detect a contact of the spectrometer device with the sample. The instructions specifically may cause the evaluation device to evaluate a combination of sensor signals of a plurality of the contact sensor devices.

Further disclosed and proposed herein is a computer program including computer-executable instructions for performing the method according to the present invention in one or more of the embodiments enclosed herein when the program is executed on a computer or computer network. Specifically, the computer program may be stored on a computer-readable data carrier and/or on a computer-readable data storage device. Thus, specifically, one, more than one or even all of method steps iii) or iv) as indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable data storage device.

Further disclosed and proposed herein is a data carrier or a computer-readable data storage device having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier and/or on a computer-readable data storage device, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the method according to one or more of the embodiments disclosed herein may be performed or supported by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

The spectrometer device and the method provide a plurality of advantages over known devices and methods of this kind. Thus, specifically, the spectrometer device and the method address the above-mentioned technical challenges. Specifically, the spectrometer device may be applied in the field, under rough conditions and, still, may provide a well-defined and reproducible measurement set up. The spectrometer device may detect, by itself, a contact with the sample, specifically if the entrance window or the spacer are in contact with the sample. Thereby, light attenuation from the sample may always be estimated correctly, and, thus, the reproducibility of measurements may be increased significantly.

Summarizing and without excluding further possible embodiments, the following embodiments may be envisaged:

Embodiment 1: A spectrometer device for optical analysis of at least one sample, comprising:
- at least one housing having at least one entrance window;
- at least one wavelength-selective element configured for separating incident light into a spectrum of constituent wavelengths, the wavelength-selective element being disposed within the housing;
- at least one detector device configured for detecting at least a portion of the constituent wavelengths, the detector device being disposed within the housing; and
- at least one contact sensor device for detecting a contact of the spectrometer device with the sample.

Embodiment 2: The spectrometer device according to the preceding embodiment, wherein the spectrometer is configured for being operated in a reflective mode.

Embodiment 3: The spectrometer device according to any one of the preceding embodiments, wherein the spectrometer device comprises at least one illumination source for illuminating the sample.

Embodiment 4: The spectrometer device according to any one of the preceding embodiments, wherein the contact sensor device is configured for detecting a contact between the entrance window and the sample.

Embodiment 5: The spectrometer device according to any one of the preceding embodiments, wherein the spectrometer device comprises at least one spacer element, wherein the contact sensor device is configured for detecting a contact of the spacer element with the sample.

Embodiment 6: The spectrometer device according to any one of the preceding embodiments, wherein the entrance window is fully or partially made of at least one transparent material.

Embodiment 7: The spectrometer device according to any one of the preceding embodiments, wherein the contact sensor device comprises at least one device selected from the group consisting of: an optical contact sensor device; an electrical contact sensor device; a mechanical contact sensor device, specifically an acoustic contact sensor device.

Embodiment 8: The spectrometer device according to any one of the preceding embodiments, wherein the contact sensor device comprises at least one optical contact sensor device.

Embodiment 9: The spectrometer device according to the preceding embodiment, wherein the optical contact sensor device is configured for detecting a contact of the entrance window with the sample.

Embodiment 10: The spectrometer device according to any one of the two preceding embodiments, wherein the optical contact sensor device comprises at least one optical emitter device and at least one optical detector device, wherein at least one optical signal is transmitted from the optical emitter device to the optical detector device, wherein the optical contact sensor device is configured to detect an influence of the presence of the sample onto the transmission of the optical signal.

Embodiment 11: The spectrometer device according to the preceding embodiment, wherein the optical contact sensor device is configured for transmitting the optical signal at least partially by using the entrance window as a waveguide.

Embodiment 12: The spectrometer device according to the preceding embodiment, wherein the optical contact sensor device is configured such that a contact between the sample and the entrance window changes the waveguide properties of the entrance window.

Embodiment 13: The spectrometer device according to any one of the preceding embodiments, wherein the contact sensor device comprises at least one inertial sensor.

Embodiment 14: The spectrometer device according to the preceding embodiment, wherein the inertial sensor comprises at least one of a vibrational sensor or a motion sensor.

Embodiment 15: The spectrometer device according to any one of the two preceding embodiments, wherein the inertial sensor comprises at least one movable element, wherein one or both of a vibration or a motion of the movable element is changed by contact of the spectrometer device with the sample.

Embodiment 16: The spectrometer device according to any one of the three preceding embodiments, wherein the inertial sensor comprises at least one oscillating element, wherein a contact of the spectrometer device with the sample changes at least one oscillation property of the oscillating element.

Embodiment 17: The spectrometer device according to any one of the preceding embodiments, wherein the contact sensor device comprises at least one electromagnetic emitter.

Embodiment 18: The spectrometer device according to any one of the preceding embodiments, wherein the contact sensor device comprises at least one of a WiFi or a Bluetooth module.

Embodiment 19: The spectrometer device according to any one of the preceding embodiments, wherein the contact sensor device comprises at least one proximity sensor device.

Embodiment 20: The spectrometer device according to any one of the preceding embodiments, wherein the contact sensor device comprises at least one capacitive proximity sensor device.

Embodiment 21: The spectrometer device according to any one of the preceding embodiments, the spectrometer device comprising a plurality of contact sensor devices, the spectrometer device further comprises at least one evaluation device, the evaluation device being configured for evaluating a combination of sensor signals of the plurality of contact sensor devices.

Embodiment 22: The spectrometer device according to the preceding embodiment, wherein the evaluation device comprises at least one data processing unit, wherein the data processing unit is configured by programming for applying a mathematical algorithm to the sensor signals of the plurality of contact sensor devices.

Embodiment 23: The spectrometer device according to any one of the two preceding embodiments, wherein the evaluation device is configured to apply a Kalman filter to the sensor signals.

Embodiment 24: The spectrometer device according to any one of the preceding embodiments, wherein the spectrometer device is configured for automatically triggering the optical analysis of the at least one sample when the contact sensor device detects a contact of the spectrometer device with the sample.

Embodiment 25: The spectrometer device according to any one of the preceding embodiments, wherein the spectrometer device is a handheld spectrometer device.

Embodiment 26: A method for optically analyzing at least one sample, the method comprising:
  i) providing at least one spectrometer device according to any one of the preceding embodiments;
  ii) approaching at least one sample to be analyzed with the spectrometer device;
  iii) detecting a contact of the spectrometer device with the sample by using the contact sensor device; and
  iv) performing at least one optical analysis of the sample by using the spectrometer device.

Embodiment 27: A use of the spectrometer device according to any one of the preceding embodiments claims referring to a spectrometer device, for a purpose of use, selected from the group consisting of: an infrared detection application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; a motion control application; an exhaust control application; a gas sensing application; a gas analytics application; a chemical sensing application.

Embodiment 28: A computer program for use in a spectrometer device according to any one of the preceding embodiments referring to a spectrometer device, comprising instructions which, when the computer program is executed by an evaluation device of the spectrometer device, cause the evaluation device to evaluate at least one sensor signal provided by the at least one contact sensor device of the spectrometer device and to detect a contact of the spectrometer device with the sample.

Embodiment 29: The computer program according to the preceding embodiment, wherein the instructions cause the evaluation device to evaluate a combination of sensor signals of a plurality of the contact sensor devices.

SHORT DESCRIPTION OF THE FIGURE

Further optional features and embodiments will be disclosed in more detail in the subsequent description of an embodiment, preferably in conjunction with the dependent claims. Therein, the respective optional features may be realized in an isolated fashion as well as in any arbitrary feasible combination, as the skilled person will realize. The scope of the invention is not restricted by the preferred embodiment. The embodiment is schematically depicted in the FIGURE.
In the FIGURE:
FIG. 1 shows an exemplary embodiment of a spectrometer device comprising a contact sensor device.

DETAILED DESCRIPTION OF THE EMBODIMENT

In FIG. 1, an exemplary embodiment of a spectrometer device 110 is shown. The spectrometer device 110, in the specific example, specifically may be embodied as a mobile or hand-held spectrometer device. The spectrometer device 110, in FIG. 1, is shown in a cross-sectional view. The spectrometer device 110 is configured for analyzing at least one sample 112. In FIG. 1, for example, a liquid sample 112 is shown. Still, the spectrometer device 110 may also be applied for other types of samples 112, such as a solid sample, e.g. grain, fruits or vegetables. Further examples are also possible. In the setup of FIG. 1, the spectrometer device 110 is shown in a physical contact with the sample 112, such as by immersion of a front end 114 of the spectrometer device 110 into the sample 112.

The spectrometer device 110 comprises a housing 116. The housing 116 has at least one entrance window 118. The spectrometer device 110 further comprises, disposed within the housing 116, at least one wavelength-selective element 120 configured for separating incident light 123 into a spectrum of constituent wavelengths. The spectrometer device 110 further comprises, disposed within the housing 116, at least one detector device 122 configured for detecting at least a portion of the constituent wavelengths. The spectrometer device 110 may further comprise at least one evaluation device 124, e.g. an evaluation device 124 having at least one processor, wherein the evaluation device 124, as an example, may be configured for evaluating detector signals of the at least one detector device 122.

The spectrometer device 110 further comprises at least one contact sensor device 126 configured for detecting a contact of the spectrometer device 110 with the sample 112. As an example, the contact sensor device 126 may be configured for detecting a contact between the entrance window 118 with the sample 112. Thus, as an example, the contact sensor device 126 may be or may comprise an optical contact sensor device 128. The optical contact sensor device 128, as an example, may comprise at least one optical emitter device 130 which, as an example, may be positioned at a rim 132 of the entrance window 118. The entrance window 118 may fully or partially be made of an optically transparent material having wave-guiding properties. Thus, the optical contact sensor device 128 may further comprise at least one optical detector device 134, e.g. at an opposing rim 136 of the entrance window 118. The optical emitter device 130 may emit light into the entrance window 118. In the entrance window 118, the light may be guided due to the wave-guiding properties of the entrance window 118, to the opposing rim 136 and the optical detector device 134. When in contact with the sample 112, however, the wave-guiding properties of the entrance window 118 change. Thus, once a contact with the sample 112 is established, the signal transmitted from the optical emitter device 130 to the optical detector device 134 changes. This change in the signal may be used for detecting a contact between the spectrometer device 110 and the sample 112. As an example, the optical contact sensor device 128 may be controlled by the evaluation device 124 and/or by a separate control or evaluation device.

The spectrometer device 110 specifically may be operated in a reflective mode. For this purpose, the spectrometer device 110 may comprise one or more illumination sources 138. The at least one illumination source 138, as an example, may fully or partially be positioned inside the housing 116 and/or outside the housing 116.

In the setup of FIG. 1, as an example, an optical contact sensor device 128 is shown. Still, other types of contact sensor devices 126 may be used. Thus, as outlined above, electrical and/or mechanical contact sensor devices may be used in addition or alternatively. As an example, a vibration or motion change using an inertial measurement unit may be used. The vibration and/or motion is, as an example, reduced once a contact between the spectrometer device 110 and the sample 112 is established. This measurement principle may also be used even if the spectrometer device 110 is a hand-held spectrometer device 110. Additionally or alternatively, as an example, an electrical measurement principle may be used for the contact sensor device 126. Thus, as an example, a WiFi and/or a Bluetooth module may be implemented. Therein, a signal attenuation due to the contact to the sample 112 may be detected, specifically if the modules are in the vicinity of the sample 112. These exemplary embodiments show that, besides using an optical contact sensor device 128, other measurement principles are possible.

Since each of the measurement principles generally gives indication about contact to the sample 112, one or more of these ways of detection may even be combined. Thus, as an example, the signals may be provided to the evaluation device 128. Therein, the signals may be combined in a mathematical model which, as an example, is monitored by a Kalman filter.

LIST OF REFERENCE NUMBERS 110 spectrometer device
112 sample
114 front end
116 housing
118 entrance window
120 wavelength-selective element
122 detector device
123 light
124 evaluation device
126 contact sensor device
128 optical contact sensor device
130 optical emitter device
132 rim
134 optical detector device
136 opposing rim
138 illumination source

REFERENCES

Richard A. Crocombe, "Handheld spectrometers in 2018 and beyond: MOEMS, photonics, and smartphones," Proc. SPIE 10545, MOEMS and Miniaturized Systems XVII, 105450C (22 Feb. 2018); doi: 10.1117/12.2286492

The invention claimed is:

1. A spectrometer device for optical analysis of at least one sample, comprising:
    at least one housing having at least one entrance window;
    at least one wavelength-selective element configured for separating incident light into a spectrum of constituent wavelengths, the wavelength-selective element being disposed within the housing;
    at least one detector device configured for detecting at least a portion of the constituent wavelengths, the detector device being disposed within the housing; and
    at least one contact sensor device for detecting a contact of the spectrometer device with the sample, wherein the contact sensor device comprises at least one optical contact sensor device, wherein the optical contact sensor device is configured for detecting a contact of the entrance window with the sample, wherein the optical contact sensor device comprises at least one optical emitter device and at least one optical detector device, wherein at least one optical signal is transmitted from the optical emitter device to the optical detector device, wherein the optical contact sensor device is configured to detect an influence of the presence of the sample onto the transmission of the optical signal, wherein the at least one optical emitter device is positioned at a rim of the entrance window, wherein the entrance window is fully or partially made of an optically transparent material having wave-guiding properties, wherein the at least one optical detector device is positioned at an opposing rim of the entrance window, wherein the optical emitter device emits light into the entrance window.

2. The spectrometer device according to claim 1, wherein the spectrometer device comprises at least one illumination source for illuminating the sample.

3. The spectrometer device according to claim 1, wherein the contact sensor device is configured for detecting a contact between the entrance window and the sample.

4. The spectrometer device according to claim 1, wherein the spectrometer device comprises at least one spacer element, wherein the contact sensor device is configured for detecting a contact of the spacer element with the sample.

5. The spectrometer device according to claim 1, wherein the contact sensor device comprises at least one device selected from the group consisting of an optical contact sensor device; an electrical contact sensor device; a mechanical contact sensor device and an acoustic contact sensor device.

6. The spectrometer device according to claim 1, wherein the optical contact sensor device is configured for transmitting the optical signal at least partially by using the entrance window as a waveguide, wherein the optical contact sensor device is configured such that a contact between the sample and the entrance window changes the waveguide properties of the entrance window.

7. The spectrometer device according to claim 1, wherein the contact sensor device comprises at least one inertial sensor.

8. The spectrometer device according to claim 7, wherein the inertial sensor comprises at least one of a vibrational sensor or a motion sensor.

9. The spectrometer device according to claim 7, wherein the inertial sensor comprises at least one movable element, wherein one or both of a vibration or a motion of the movable element is changed by contact of the spectrometer device with the sample.

10. The spectrometer device according to claim 1, wherein the contact sensor device comprises at least one of a WiFi or a Bluetooth module.

11. The spectrometer device according to claim 1, the spectrometer device comprising a plurality of contact sensor devices, the spectrometer device further comprises at least one evaluation device, the evaluation device being configured for evaluating a combination of sensor signals of the plurality of contact sensor devices.

12. The spectrometer device according to claim 1, wherein the spectrometer device is configured for automatically triggering the optical analysis of the at least one sample when the contact sensor device detects a contact of the spectrometer device with the sample.

13. The spectrometer device according to claim 1, wherein the spectrometer device is a hand-held spectrometer device.

14. A method for optically analyzing at least one sample, the method comprising:
    i) providing at least one spectrometer device according to claim 1;
    ii) approaching at least one sample to be analyzed with the spectrometer device;
    iii) detecting a contact of the spectrometer device with the sample by using the contact sensor device; and
    iv) performing at least one optical analysis of the sample by using the spectrometer device.

15. A method of using the spectrometer device according to claim 1, the method comprising using the spectrometer device for a purpose of use selected from the group consisting of an infrared detection application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; an exhaust control application; a gas sensing application; a gas analytics application; and a chemical sensing application.

16. A computer program for use in a spectrometer device according to claim 1, comprising instructions which, when the computer program is executed by an evaluation device of the spectrometer device, cause the evaluation device to evaluate at least one sensor signal provided by the at least one contact sensor device of the spectrometer device and to detect a contact of the spectrometer device with the sample.

* * * * *